3,139,940
         LAWN EDGER
George M. Randell, 2642 Rosemont St., Chicago 45, Ill.
      Filed Nov. 19, 1962, Ser. No. 238,689
            8 Claims. (Cl. 172—15)

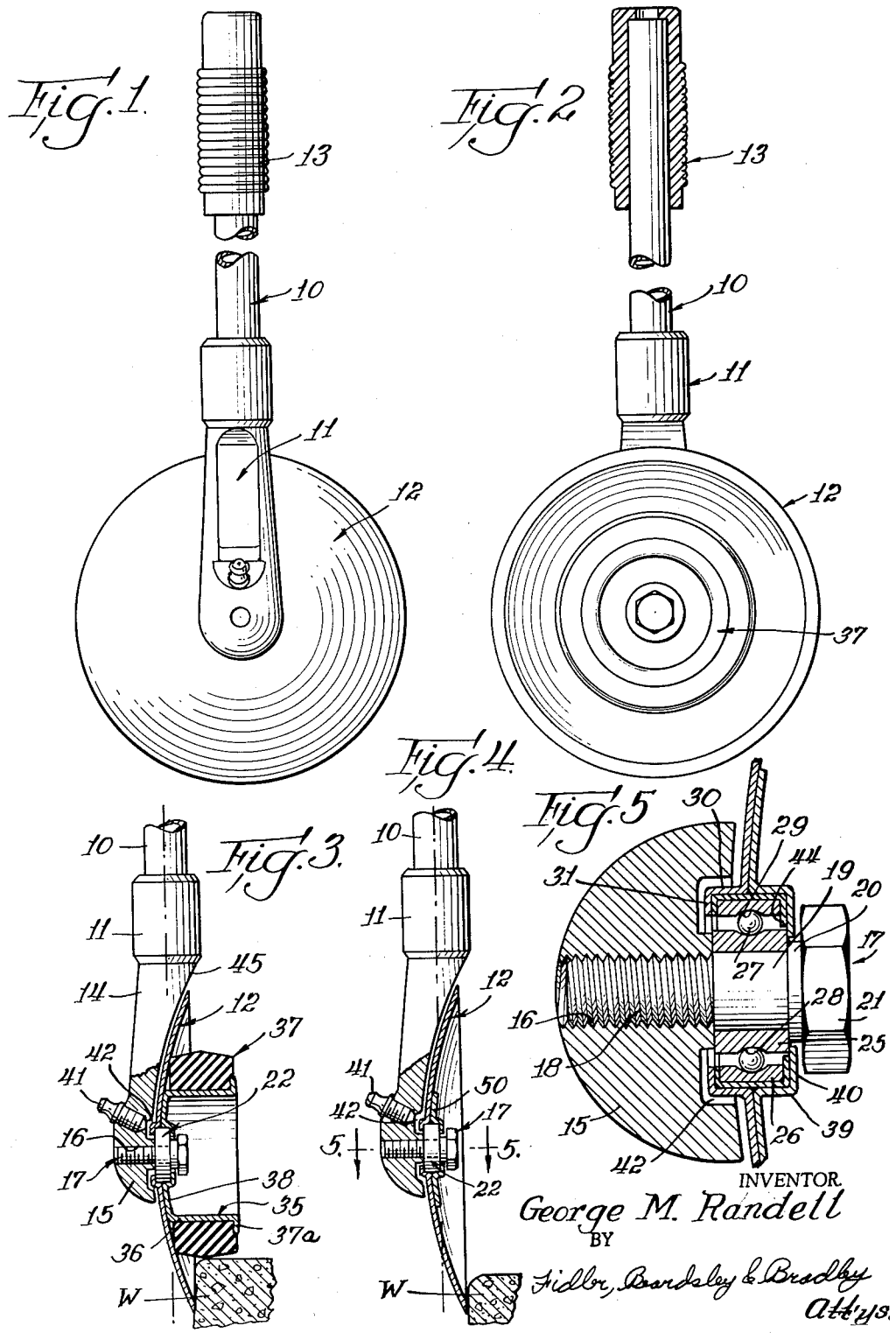

This invention relates to lawn edgers and has to do more particularly with a new and improved lawn edger of the rotary type which in one embodiment thereof can be used as a spade or a turf cutter.

Lawn edgers as heretofore constructed have often included a handle and a generally circular cutting blade mounted for rotation on a shaft extending perpendicularly to one end of the handle. In one form of prior art lawn edger, the cutting blade is supported rotatably on a shaft mounted in two spaced bearings. This construction is relatively expensive and rigidly supports the cutting blade so that it is easily damaged from contact with the rough edges of a sidewalk or curb during use. Moreover, the construction is such that the edger cannot be conveniently used as a spade or shovel. In another form of lawn edger, the blade is supported in cantilever fashion from a stub shaft carried by the end of the handle. Here also the blade is supported rigidly and therefore is easily damaged. Moreover, the cantilever support places the blade in a position offset from the longitudinal center line of the handle so that when a cutting force is applied to the handle an undesirable force is applied to the mounting shaft and blade and often causes the blade to bind on the body in which it is supported and also produces a strain on the bearing and consequent damage to the device. Additionally, lawn edger blades are customarily made of mild, soft steel and consequently are easily nicked and dulled from contact with stones and with the edges of walks and curbs.

In accordance with the present invention, a lawn edger is provided wherein the cutter blade is mounted on a stub shaft projecting perpendicularly from one end of the handle, the arrangement being such that the blade is in line with the longitudinal center line of the handle so that the force applied to the blade to operate the device is substantially in alignment with the portion of the blade between the hub and the cutting edge and there is no likelihood of the blade mounting being bent or damaged. Moreover, the blade is mounted on the stub shaft by a "wobble" bearing whereby the blade can "wobble" about its axis of rotation when it is in use. Thus, if the blade should strike a projection or rough portion on a curb or walk, the blade will be displaced slightly from its normal position and will not be nicked. Moreover, the blade is formed from spring steel and is heat treated to provide sufficient hardness so that it is not readily nicked or dulled and retains its shape and sharpness over a long period of use. The blade takes the shape of a portion of a sphere with the cutting edge being provided at the periphery of the blade. This form of blade provides a self-sharpening action so that as the blade is rotated in contact with the edge of a walk or curb it is thereby maintained in sharpened condition.

An object of the present invention is to provide a new and improved lawn edger.

Another object of the invention is to provide a new and improved lawn edger which can be used also as a turf cutter or as a spade, shovel or disking tool.

Another object is to provide a lawn edger wherein the blade is so mounted that the blade will "wobble" during use and will not be damaged by reason of ordinary engagement between the blade and a bump or projection on the edge of a sidewalk or curbstone.

Another object is to provide a lawn edger having a rotary blade which is so mounted that the force exerted on the blade during normal use passes through the blade and there is a minimum of damaging strain on the blade and its mounting.

Another object is to provide a lawn edger having a blade formed of such material so treated that it retains its shape and sharpness over a long period of use and is not readily subject to nicking or dulling.

Other objects and advantages will appear from the following description taken in connection with the drawings, wherein:

FIG. 1 is a side elevational view of the edger;

FIG. 2 is a side elevational view of the edger taken from the opposite side of the device from that shown in FIG. 1 with the grip being shown in section;

FIG. 3 is a fragmentary view of the cutting blade and associated parts shown in section;

FIG. 4 is a view similar to FIG. 3 showing a second embodiment of the invention; and FIG. 5 is an enlarged sectional view taken along line 5—5 of FIG. 4.

Referring now particularly to FIGS. 1 to 3, the edger includes generally a handle 10, a body 11, and a cutter blade 12. The handle, which is of sufficient length to permit convenient operation of the device without the operator stooping, is elongate and preferably is formed from a metal tube and preferably is provided with a grip 13 of synthetic plastic material or rubber. The handle 10 is fitted into a socket (not shown) in the body 11, and is press-fitted or otherwise suitably secured therein.

The body 11 is formed with a shank 14 and a head 15 integral therewith and preferably is formed of metal such as grey iron. The head 15 is formed with a tapped bore 16 extending perpendicularly to the center line of the handle 10 and adapted to receive a bolt 17 serving as a stub shaft for mounting the cutting blade 12. The bolt 17 has a shank formed with a threaded portion 18 threaded into the bore 16, an unthreaded shank portion 19, a shoulder 20 of larger diameter than the shank portion 19 and a head 21.

A supporting bearing 22 for the cutter blade 12 is mounted on the unthreaded shank portion 19 and includes an inner bearing member 25 of generally annular form and an outer bearing member 26 of generally annular form and a plurality of bearing balls 27 disposed between the bearing members 25 and 26. The inner bearing member is provided with a groove 28 of generally arcuate cross-section and of larger radius than the bearing ball and the outer bearing member 26 is formed with a similar and opposing groove 29. The arrangement of the bearing 22 is such that the outer bearing member 26 can rock or "wobble" about the series of bearing balls 27 so that the cutting blade 12 can "wobble" about the axis of the bolt or stub shaft 17.

The cutting blade 12 is disk shape and takes the form of a portion of a sphere and is provided with a hub at its central portion comprising a cylindrical portion 30 and an annular lip or flange 31. The flange 31 extends over the inner face of the outer bearing member 26, but not across the space between the bearing members for a purpose which will hereinafter appear. A wheel 35 of disk form is provided having a rim 36 carrying a tire 37. The tire is formed preferably of hard rubber and is bonded on the rim 36 and retained by a flange 37a. The wheel 35 is formed with a body 38 extending inwardly from the rim 36 and having a hub corresponding generally in shape to the hub of the cutting blade 12. The hub of the wheel 35 has a cylindrical portion 39 and a flange 40 positioned to overlie the outer bearing member 26 and the space between the inner and outer bearing members.

The wheel 35 is placed with its body portion 38 in engagement with the corresponding portion of the cutting blade 12 and is suitably secured to the latter as by spot or projection welding. Thus, the hubs of the cutting blade 12 and of the wheel 35 receive the bearing and serve to support the cutting blade 12 and wheel 35 on the outer bearing member 26 for rotation therewith relative to the stub shaft 17.

A lubricating fitting 41 of conventional form is threaded into the head 15 and positioned to permit the introduction of a solid lubricant such as grease into the bearing 22. The flange 31 of the cutting blade hub does not extend across the space between the bearing members 25 and 26 and, therefore, the lubricant can enter the bearing from the space between the bearing and the head 15. On the other hand, flange 40 of the hub of the wheel 35 substantially closes the space between the bearing member and contains lubricant within the bearing. A metal shield 44 is formed around the bearing and serves as a dust shield. It will be noted that there is a sufficient clearance between the flange 40 and the bearing members and between the flange 40 and the head 21 of the bolt 17 to permit "wobbling" or rocking action of the combined cutting blade 12 and wheel 35 relatively to the stub shaft for purposes hereinafter explained.

In order to lubricate the device, lubricant is forced in through the fitting by conventional pressure means such as a grease gun (not shown). The lubricant is forced into the bearing in the space between the inner and outer bearing members 25 and 26, and also into the space 42 between the cutting blade 12 and the body 11.

The periphery of the cutting blade 12, which is circular in shape, is sharpened to provide a cutting edge as seen particularly in FIG. 3.

The cutting blade 12 is so mounted that it is offset relative to the center line of the handle 10 whereby the plane of the center line passes through the blade at a point approximately mid-way between the hub and the cutting edge. Thus, the larger portion of the stub shaft 18 and substantially all of the bearing 22 are on one side of the plane through the center line of the handle and the cutting edge is on the other side of the plane. Accordingly, the projected area of the cutting blade 12 when in use is located substantially equally on opposite sides of the plane through the center line of the handle.

In use, the edger is used in a manner similar to that of other rotary type edgers employing a disk-shaped cutting blade; that is, it is positioned along the edge of the lawn to be trimmed or edged, and is advanced, which action imparts a rotary motion to the cutter blade so that there is a cutting action due to a combined vertical pressure and rolling action of the rolling or advancing motion of the edge of the cutting blade 12. Where the edger is used to edge a lawn adjacent a walk or curb, the blade is maintained in engagement with the walk or curb as seen particularly in FIG. 3. The rolling action of the blade in contact with the walk serves to hone or sharpen the blade and maintain it constantly sharp.

The mounting of the blade by the "wobble" type of bearing permits the bearing to wobble about the axis of the stub shaft. Thus, if the blade comes into contact with a roughened or projecting portion of the walk or curb, the blade will rock and move past such projecting portion without being nicked. The action of the bearing is such that the blade may rock as much as ¼" at its periphery.

Where the soil is relatively firm, the blade will normally project into the soil to approximately the extent indicated in FIG. 3 and the tire 37 will not contact the surface of the ground. However, the movement of the blade handle will cause rotary action of the blade and consequent cutting of the turf.

On the other hand, where the soil is relatively soft and the blade tends to sink into the soil, the tire 37 may come into contact with the surface of the soil and support the cutting blade at the desired depth in the soil. Where this occurs, the contact of the tire 37 with the soil will cause rotation of the cutting blade 12. Since the periphery of the cutting blade is greater in extent than the periphery of the wheel, the cutting blade will move at a faster linear speed than the wheel and thus enhance the cutting action.

In the preferred form of the invention, shown in FIG. 4, the edger is identical in construction with that shown in FIGS. 1 to 3 except that the wheel 35 and tire 37 are omitted and a hub plate 50 is provided and is suitably secured as by spot or projection welding to the inner face of the cutting blade 12. The hub plate 50 preferably is formed similar to the body portion 38 of the wheel 35 and has a similarly formed hub portion. Thus the cutting blade 12 and the hub plate 50 serve to support the cutting blade 12 on the bearing 22 in a manner similar to that described for the cutting blade 12 and wheel 35 in the form of the invention illustrated in FIGS. 1 to 3.

The form of the invention shown in FIG. 4 operates in a generally similar manner to that shown in FIGS. 1 to 3 except for the absence of the wheel 35 and tire 37 and their functions.

In the form of the invention shown in FIG. 4, the edger may not only be used as an edger, but also as a disk for disking soil or as a spade or shovel.

I have found that the blade may be caused to retain its shape and sharpness for a long period of use by forming it from spring steel and suitably heat-treating it. Preferably, the blade is formed from an SAE 1075 steel and is heat treated as follows: The blade is heated to 1600° F., then quenched in oil, then tempered by heating it to a temperature of from around 400° F. to around 600° F., and then quenched in brine or water. A spring steel cutting blade hardened as above stated has a hardness of from around 55 to around 60 Rockwell "C" scale.

From the foregoing, it will be seen that this invention provides a new and improved lawn edger wherein the cutting blade is so mounted that it does not bend in use. It does not place any undue strain on the mounting bearing or stub shaft. The force on the blade is in the center of the projected area of the cutting blade and, therefore, there is no force tending to tilt or cant the blade. The blade is mounted for a slightly "wobbling" action about its axis and, therefore, is not likely to be nicked should it encounter a projection on the face of the walk or curb against which the blade is being rotated. The blade is of such hardness that it maintains its sharpness over a long period of use and is not readily nicked or dulled. Moreover, the blade in one form is so designed that it can be used as a disking tool, a spade or a shovel. The tool is relatively simple and can be made at a relatively low cost with a minimum of machine operation.

I claim:

1. A lawn edger of the rotary blade type comprising handle means having a longitudinal axis, an end of said handle means having a surface lying in a plane substantially parallel to said axis and offset a predetermined distance therefrom, a stub shaft secured on a second axis perpendicular to said surface, a self-aligning bearing secured upon said stub shaft adjacent said surface, and a concavo-convex disc having a peripheral cutting edge and having a center mounted upon said bearing with the convex side thereof facing said surface, the projection of the axis of said handle passing through said disc between said cutting edge and said center thereof.

2. The lawn edges of claim 1, said self-aligning bearing being a ball bearing including raceways having a greater transverse diameter than the balls thereof.

3. The lawn edger of claim 1, including a wheel of smaller diameter than the cutting edge of said disc, said wheel having a greater transverse width than the depth of the concave side of said disc, and means for mounting said wheel adjacent the concave side of said disc.

4. The lawn edger of claim 2, including a wheel of smaller diameter than the cutting edge of said disc, said wheel having a greater transverse width than the depth of the concave side of said disc, and means for mounting said wheel adjacent the concave side of said disc, and said wheel being peripherally crowned.

5. The lawn edger of claim 1, including a wheel of smaller diameter than the cutting edge of said disc, said wheel having a greater transverse width than the depth of the concave side of said disc, and means for mounting said wheel adjacent the concave side of said disc, said wheel being peripherally crowned and frictionally mounted adjacent the concave side of said disc.

6. The lawn edger of claim 5, said crown being highest at the transverse center thereof and being mountable with either side thereof adjacent said disc.

7. The lawn edger of claim 5, said self-aligning bearing being a ball bearing including raceways having a greater transverse diameter than the balls thereof.

8. The lawn edger of claim 1, said second axis of said stub shaft intersecting said longitudinal axis of said handle.

References Cited in the file of this patent
UNITED STATES PATENTS

| | | |
|---|---|---|
| 1,181,281 | Albert | May 2, 1916 |
| 2,654,180 | Redfield | Oct. 6, 1953 |
| 2,053,035 | Earley | Sept. 11, 1962 |